(12) United States Patent
Dickerson

(10) Patent No.: US 12,181,557 B2
(45) Date of Patent: *Dec. 31, 2024

(54) LOW-FREQUENCY RADIO NAVIGATION SYSTEM

(71) Applicant: Arbiter Systems, Inc., Paso Robles, CA (US)

(72) Inventor: William J. Dickerson, Saint George, UT (US)

(73) Assignee: Arbiter Systems, Inc., Paso Robles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,721

(22) Filed: Apr. 17, 2023

(65) Prior Publication Data

US 2023/0258757 A1 Aug. 17, 2023

Related U.S. Application Data

(63) Continuation of application No. 17/367,116, filed on Jul. 2, 2021, now Pat. No. 11,656,313, which is a
(Continued)

(51) Int. Cl.
*G01S 1/68* (2006.01)
*G01S 1/46* (2006.01)
(Continued)

(52) U.S. Cl.
CPC .............. *G01S 1/685* (2013.01); *G01S 1/46* (2013.01); *G01S 5/0221* (2013.01); *G01S 5/0226* (2013.01); *G01S 7/282* (2013.01)

(58) Field of Classification Search
CPC .......... G01S 1/685; G01S 1/46; G01S 5/0221; G01S 5/0226; G01S 7/282
(Continued)

(56) References Cited

U.S. PATENT DOCUMENTS 3,031,663 A 4/1962 Wennerberg
4,087,187 A 5/1978 Asaro
(Continued)

FOREIGN PATENT DOCUMENTS

| CN | 109669175 A | * | 4/2019 | ............. G01S 13/32 |
| CN | 116033338 A | * | 4/2023 | |
| DE | 102017128507 A1 | * | 6/2018 | ........... G01S 13/003 |

OTHER PUBLICATIONS

Dickerson; U.S. Appl. No. 16/428,620, filed May 31, 2019.
(Continued)

*Primary Examiner* — Harry K Liu
(74) *Attorney, Agent, or Firm* — Fitch, Even, Tabin & Flannery LLP

(57) ABSTRACT

Systems and methods for a low-frequency radio navigation system are described. The system may include a transmitter comprising a base coded modulator configured to generate a base modulation and a data coded modulator configured to generate a data modulation; wherein the transmitter radiates a continuous, constant-power chirped-FM spread spectrum signal, comprising: the base modulation; and the data modulation, wherein the data modulation is orthogonal to the base modulation. The system may also include a receiver comprising a digital signal processor, wherein at least one matched filter coupled to the digital signal processor, the at least one matched filter configured to decode said base modulation and data-encoded modulation and provide a correlation function for received signals received from at least three geographically-spaced transmitters.

29 Claims, 8 Drawing Sheets

Related U.S. Application Data continuation of application No. 16/428,620, filed on May 31, 2019, now Pat. No. 11,085,989.

(51) Int. Cl.
  *G01S 5/02* (2010.01)
  *G01S 7/282* (2006.01)

(58) Field of Classification Search
  USPC .......................................................... 342/385
  See application file for complete search history.

(56) References Cited

U.S. PATENT DOCUMENTS

| | | |
|---|---|---|
| 7,944,994 B2 | 5/2011 | Matsuura |
| 8,976,061 B2 | 3/2015 | Chowdhury |
| 10,559,052 B1 | 2/2020 | Reed |
| 10,613,197 B2 | 4/2020 | Ito |
| 10,921,424 B2 | 2/2021 | Longman |
| 11,085,989 B2 | 8/2021 | Dickerson |
| 11,656,313 B2 | 5/2023 | Dickerson |
| 2008/0088507 A1 | 4/2008 | Smith |
| 2010/0033366 A1 | 2/2010 | Shibata |
| 2013/0141233 A1 | 6/2013 | Jacobs |
| 2014/0266826 A1* | 9/2014 | Valley ................. H03M 1/1245 341/137 |
| 2019/0297489 A1* | 9/2019 | Lei ...................... H04W 64/003 |
| 2020/0379075 A1 | 12/2020 | Dickerson |
| 2021/0333349 A1 | 10/2021 | Dickerson |

OTHER PUBLICATIONS

Dickerson; U.S. Appl. No. 17/367,116, filed Jul. 2, 2021.
USPTO; Non-Final Office Action issued in U.S. Appl. No. 16/428,620 mailed Feb. 25, 2021.
USPTO; Non-Final Office Action issued in U.S. Appl. No. 17/367,116 mailed Oct. 24, 2022.
USPTO; Notice of Allowance issued in U.S. Appl. No. 16/428,620 mailed Apr. 22, 2021.
USPTO; Notice of Allowance issued in U.S. Appl. No. 17/367,116 mailed Jan. 27, 2023.

* cited by examiner

LOW-FREQUENCY RADIO NAVIGATION SYSTEM

This application is a continuation of U.S. application Ser. No. 17/367,116 filed Jul. 2, 2021, for LOW-FREQUENCY RADIO NAVIGATION SYSTEM, which is a continuation of U.S. application Ser. No. 16/428,620, filed May 31, 2019, now U.S. Pat. No. 11,085,989 issued Aug. 10, 2021, for LOW-FREQUENCY RADIO NAVIGATION SYSTEM, which are both incorporated in their entirety herein by reference.

BACKGROUND OF THE INVENTION

1. Field of the Invention

The present invention relates generally to low-frequency radio navigation, and more specifically to low-frequency radio navigation utilizing continuous signal transmission.

2. Discussion of the Related Art

Various systems and processes are known in the art for low-frequency radio navigation utilizing continuous signal transmission.

Vulnerabilities in Global Navigation Satellite Systems (GNSS), for example the US Global Positioning System, highlight the need for an alternative, robust and terrestrial-based Position, Navigation and Time (PNT) delivery system.

One existing proposal is called e-Loran, based on the former Loran-C which was designed in the 1950s and operational in the USA until 2011, when the US Government turned off the system. e-Loran claims about the same level of PNT performance that Loran-C provided in 1962. In a presentation on the system, the only real claimed difference between Loran-C and e-Loran is a low rate (30 bps) data channel. e-Loran is still the same basic 60-year-old technology from 1958 used in Loran-C.

There is a need for a real upgrade in capability and cost/performance based on modern technologies and using the same 90-110 kHz band formerly used by Loran-C. Loran-C and e-Loran are pulsed systems with peak envelope powers in the hundreds of kW up to MW range. While this sounds impressive, they use low duty cycles, and to deal with skywave interference, they require using the (lower power) leading edge of the signal to detect a particular 'reference crossing' which being at −6 dB relative to the peak, means that for all purposes the actual useful peak power is more like tens to a few hundred kW, and the average power less than 1% of that—perhaps a kilowatt.

SUMMARY

A low-frequency radio navigation system is described. The system may include a transmitter comprising a base coded modulator configured to generate a base modulation, a data coded modulator configured to generate a data modulation, and the transmitter radiates a continuous, constant-power chirped-FM spread spectrum signal, comprising: the base modulation and the data modulation, wherein the data modulation is orthogonal to the base modulation.

In some examples of the low-frequency radio navigation system described above, said base modulation comprises a periodic frequency modulation (FM) waveform.

In some examples of the low-frequency radio navigation system described above, said base modulation is the periodic frequency modulation (FM) waveform selected from the group of waveforms consisting of a triangle waveform, a ramp (sawtooth) waveform, a sinusoid waveform, and combinations of one or more of such waveforms.

In some examples of the low-frequency radio navigation system described above, said data modulation comprises a continuous frequency-shift keying signal.

In some examples of the low-frequency radio navigation system described above, said continuous frequency-shift keying signal encodes at least one data symbol per period of said periodic frequency modulation (FM) waveform.

In some examples of the low-frequency radio navigation system described above, said continuous frequency-shift keying signal is shaped with a window function.

In some examples of the low-frequency radio navigation system described above, said window function is selected from the group of functions consisting of Hann, Hamming, Blackman and Nutall.

Some examples of the transmitter, receiver, method, and low-frequency radio navigation system described above may further include a receiver comprising a matched filter configured to process the continuous, constant-power chirped-FM spread spectrum signal.

In some examples of the low-frequency radio navigation system described above, said matched filter yields correlation of the base modulation and the data modulation to defined reference modulations. In some examples of the low-frequency radio navigation system described above, said receiver further comprises: means for determining a relative time of arrival of said continuous, constant-power chirped-FM spread spectrum signal from the transmitter within one microsecond; means for determining which data symbol values are likely encoded in said continuous, constant-power chirped-FM spread spectrum signal; and means for determining whether data symbols encoded in said continuous, constant-power chirped-FM spread spectrum signal are corrupted.

In some examples of the low-frequency radio navigation system described above, said transmitter shares a frequency band and carrier frequency with a plurality of other transmitters in an array of transmitters. In some examples of the low-frequency radio navigation system described above, a base modulation frequency for each transmitter in the array of transmitters is selected from a plurality of values. In some examples of the low-frequency radio navigation system described above, the receiver comprises at least one additional matched filer for each base modulation frequency. In some examples of the low-frequency radio navigation system described above, signals from said transmitter and said plurality of other transmitters are identified and separated in said receiver.

In some examples of the low-frequency radio navigation system described above, forward error correction is used by said receiver to compensate for symbol errors resulting from received noise, jamming or interfering signals, or signals from other transmitters in the system. In some examples of the low-frequency radio navigation system described above, a plurality of parity symbols are appended to each block of data symbols. In some examples of the low-frequency radio navigation system described above, likely corrupted symbols (data or parity) are marked as erased. In some examples of the low-frequency radio navigation system described above, wherein erased symbols are corrected, requiring a single parity symbol each to correct. In some examples of the low-frequency radio navigation system described above, wherein errorring symbols, not detected a priori as corrupted, are detected and corrected, requiring two parity symbols each to detect and correct. In some examples of the low-frequency radio navigation system described above, wherein forward error correction code may be a Reed-Solomon code.

In some examples of the low-frequency radio navigation system described above, said data modulation includes operational data comprising timing offsets, nominal transmitter antenna center position, and other information required for determination of position, navigation and time.

In some examples of the low-frequency radio navigation system described above, said data modulation includes authentication data for allowing a receiver to validate that a message was sent by an authorized transmitter and was not corrupted or modified.

In some examples of the low-frequency radio navigation system described above, said data modulation includes differential corrections that encode time-varying signal propagation differences and other system errors from nominal, allowing a receiver to correct these errors resulting in greater accuracy.

In some examples of the low-frequency radio navigation system described above, said data modulation includes altimeter corrections used by a receiver along with a local barometric pressure measurement to provide 3-dimensional position information.

In some examples of the low-frequency radio navigation system described above, transmit energy is spread over a fraction of a frequency band while minimizing power outside of the frequency band, wherein said fraction of the frequency band is 50% or greater and said power outside of said frequency band is less than 1%.

In some examples of the low-frequency radio navigation system described above, said fraction is greater than 80%, and said power outside of the frequency band less than 0.1%.

In some examples of the low-frequency radio navigation system described above, active transmit power is constant.

In some examples of the low-frequency radio navigation system described above, the transmitter is turned off periodically to synchronize a receiver to the transmitter.

In some examples of the low-frequency radio navigation system described above, the transmitter is turned off periodically wherein a transmitting site of the transmitter receives signals from other transmitters during a period when the transmitter is turned off, whereby the transmitting site receives the signals without interference from the transmitter.

In some examples of the low-frequency radio navigation system described above, the transmitter is turned off periodically wherein a receiver receives signals from other transmitters during a period when the transmitter is turned off, whereby the receiver receives the signals without interference from the transmitter.

In some examples of the low-frequency radio navigation system described above, the transmitter comprises a power output stage using direct digital synthesis.

In some examples of the low-frequency radio navigation system described above, said direct digital synthesis comprises a stepped voltage waveform.

In some examples of the low-frequency radio navigation system described above, said stepped voltage waveform comprises 4 to 64 steps per carrier cycle.

In some examples of the low-frequency radio navigation system described above, said stepped voltage waveform comprises 10 to 20 steps per carrier cycle.

Some examples of the transmitter, receiver, method, and low-frequency radio navigation system described above may further include a processor controlling timing of steps of said stepped voltage waveform.

In some examples of the low-frequency radio navigation system described above, said processor is selected from the group consisting of a field programmable gate array, a digital signal processor, a microprocessor, and a finite state machine.

In some examples of the low-frequency radio navigation system described above, said transmitter comprises a band-pass filter stage between said power output stage and an antenna.

In some examples of the low-frequency radio navigation system described above, said band-pass filter stage is optimized to cancel out part of a reactive component of antenna impedance across at least parts of a frequency band, wherein a ratio of reactive-to-active power is less than 3 at band edges of the frequency band after said band-pass filter stage.

In some examples of the low-frequency radio navigation system described above, a power supply voltage of said power output stage is continually adjusted to compensate for varying antenna impedance with frequency.

In some examples of the low-frequency radio navigation system described above, signal parameters are continually adjusted to compensate for phase variations of said power output stage, said band-pass filter stage, and an antenna system.

In some examples of the low-frequency radio navigation system described above, an amount of an adjustment of the signal parameters is determined by measuring an antenna current phase and magnitude and determining said amount of the adjustment.

In some examples of the low-frequency radio navigation system described above, a determination of adjustments is performed by one or any combination of a field programmable gate array, a digital signal processor, a microprocessor, or other computing device.

A low-frequency radio navigation system is described. The system may include a receiver comprising a digital signal processor and at least one matched filter coupled to the digital signal processor, the at least one matched filter configured to decode said base modulation and data-encoded modulation and provide a correlation function for received signals received from at least three geographically-spaced transmitters.

In some examples of the low-frequency radio navigation system described above, the digital signal processor receives and decodes received signals, which, after decoding, are re-created by digital synthesis and subtracted from other received signals, and processed to determine other transmitted signals, wherein co-channel interference is reduced.

In some examples of the low-frequency radio navigation system described above, said digital signal processor is configured to use forward error correction to compensate for symbol errors.

In some examples of the low-frequency radio navigation system described above, said receiver comprises a multi-element antenna configured to allow a received signal to be processed and combined to steer a null or maximum in a direction of an undesired or desired transmitter, and further configured to allow the received signal to be processed in such a way as to determine an approximate direction of a given transmitter.

In some examples of the low-frequency radio navigation system described above, the digital signal processor receives and decodes received signals, to provide position, navigation, or timing information.

In some examples of the low-frequency radio navigation system described above, said digital signal processor receives and decodes received signals, to provide information selected from the group consisting of: position, course, course error, heading, velocity, acceleration, speed, time, distance to a next waypoint, a projected change in course or heading, time and frequency, message authentication.

A method for determining the voltage step timing in a direct digital stepped synthesizer in a transmitter is described. The method may include receiving values for modulating signal parameters, receiving values for modulation signal corrections, receiving a precise time reference signal, determining resulting modulation parameters, including frequency and phase angle, determining times when the direct digital stepped synthesizer should step to next levels, and outputting one or a plurality of digital signals for controlling an output of said direct digital stepped synthesizer, as a function of time.

An apparatus for determining the voltage step timing in a direct digital stepped synthesizer in a transmitter is described. The apparatus may include a processor, memory in electronic communication with the processor, and instructions stored in the memory. The instructions may be operable to cause the processor to receive values for modulating signal parameters, receive values for modulation signal corrections, receive a precise time reference signal, determine resulting modulation parameters, including frequency and phase angle, determine times when the direct digital stepped synthesizer should step to next levels, and output one or a plurality of digital signals for controlling an output of said direct digital stepped synthesizer, and as a function of times.

A non-transitory computer readable medium storing code for determining the voltage step timing in a direct digital stepped synthesizer in a transmitter is described. In some examples, the code comprises instructions executable by a processor to: receive values for modulating signal parameters, receive values for modulation signal corrections, receive a precise time reference signal, determine resulting modulation parameters, including frequency and phase angle, determine times when the direct digital stepped synthesizer should step to next levels, and output one or a plurality of digital signals for controlling an output of said direct digital stepped synthesizer, and as a function of times.

In some examples of the method, apparatus, and non-transitory computer readable medium described above, values for said signal parameters are determined as continuous time functions.

In some examples of the method, apparatus, and non-transitory computer readable medium described above, values for said signal parameters are determined as sampled points.

A method for estimating signal corrections is described. The method may include receiving values for signal parameters, receiving values for signal corrections from a previous calculation, if available, sampling antenna current from a transducer, as an analog signal, digitizing said analog signal with an analog-to-digital converter, synchronized to a precise time reference signal, determining values of signal parameters of an antenna current, comparing signal parameters of said antenna current to said signal parameters, determining values of said signal corrections, outputting values of said signal corrections, and storing values of said signal corrections in a memory device.

An apparatus for estimating signal corrections is described. The apparatus may include a processor, memory in electronic communication with the processor, and instructions stored in the memory. The instructions may be operable to cause the processor to receive values for signal parameters, receive values for signal corrections from a previous calculation, if available, sample antenna current from a transducer, as an analog signal, digitize said analog signal with an analog-to-digital converter, synchronized to a precise time reference signal, determine values of signal parameters of an antenna current, compare signal parameters of said antenna current to said signal parameters, determine values of said signal corrections, output values of said signal corrections, and store values of said signal corrections in a memory device.

A non-transitory computer readable medium storing code for estimating signal corrections is described. In some examples, the code comprises instructions executable by a processor to: receive values for signal parameters, receive values for signal corrections from a previous calculation, if available, sample antenna current from a transducer, as an analog signal, digitize said analog signal with an analog-to-digital converter, synchronized to a precise time reference signal, determine values of signal parameters of an antenna current, compare signal parameters of said antenna current to said signal parameters, determine values of said signal corrections, output values of said signal corrections, and store values of said signal corrections in a memory device.

A low-frequency radio navigation system is described. The system may include a first transmitter at a first location, the first transmitter comprising: a first base coded modulator configured to generate a first base modulation; and a first data coded modulator configured to generate a first data modulation; wherein the first transmitter radiates a first continuous, constant-power chirped-FM spread spectrum signal, comprising: the first base modulation; and the first data modulation, wherein the first data modulation is orthogonal to the first base modulation, a second transmitter at a second location, the second transmitter comprising: a second base coded modulator configured to generate a second base modulation; and a second data coded modulator configured to generate a second data modulation; wherein the second transmitter radiates a second continuous, constant-power chirped-FM spread spectrum signal, comprising: the second base modulation; and the second data modulation, wherein the second data modulation is orthogonal to the second base modulation, and a third transmitter at a third location, the third transmitter comprising: a third base coded modulator configured to generate a third base modulation; and a third data coded modulator configured to generate a third data modulation; wherein the third transmitter radiates a third continuous, constant-power chirped-FM spread spectrum signal, comprising: the third base modulation; and the third data modulation, wherein the third data modulation is orthogonal to the third base modulation.

DETAILED DESCRIPTION

Figure 1:
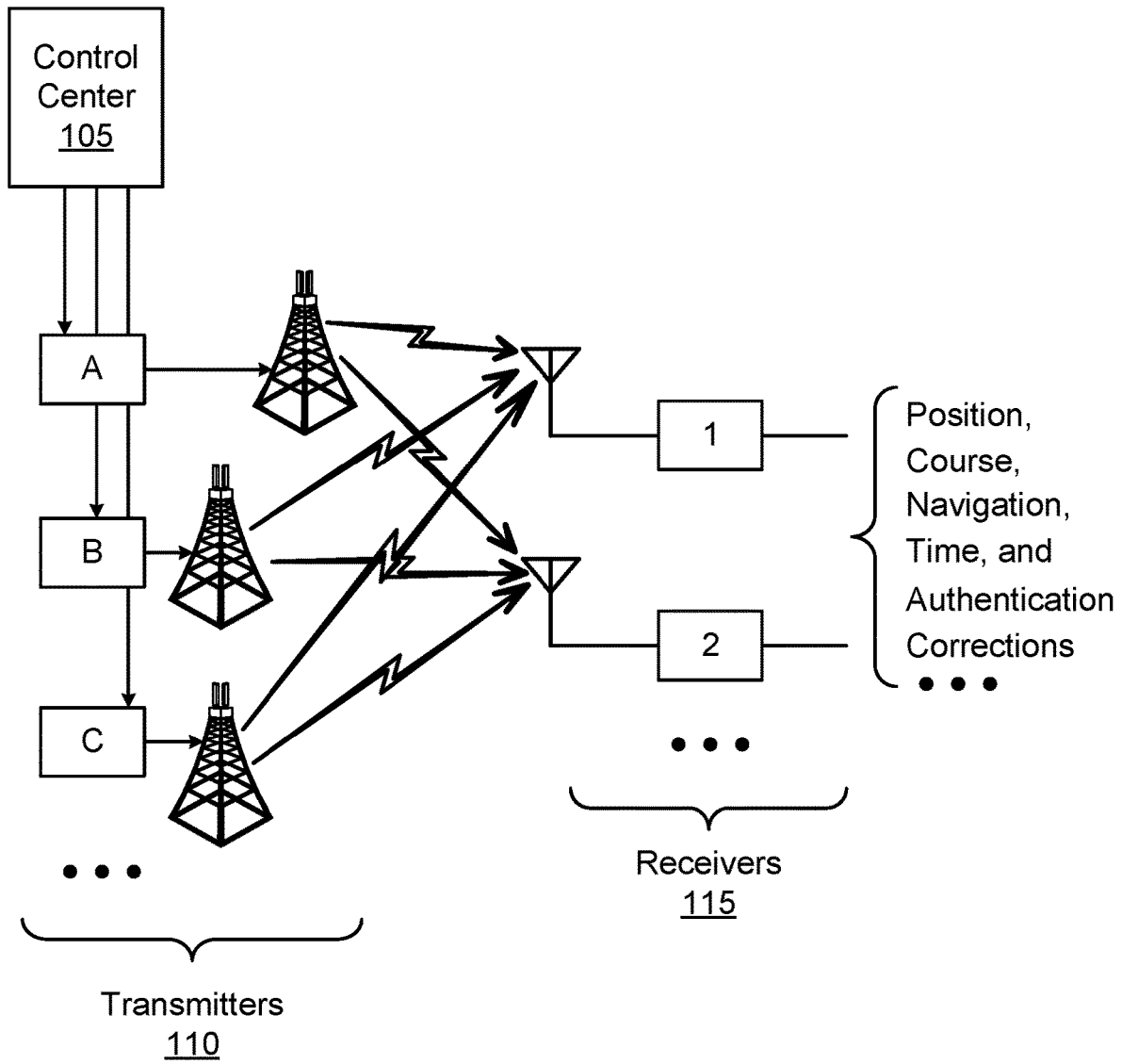
FIG. 1 shows an example of a low-frequency radio navigation system in accordance with aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present disclosure describes a resilient terrestrial PNT system using a novel modulation scheme, allowing the use of continuous signal transmission (CW or 'continuous wave'), thereby allowing a much lower peak transmitter power in the range of 1-10 kW. Lower peak power translates into lower peak voltages, lower cost and greater reliability. CW navigation systems have been proposed in the past, but those implementations suffered from skywave problems with no way to fix them. Loran-C offers a way to overcome skywave interference, but at significant cost.

The proposed system uses 'chirp FM' technology originally developed for radars by the US military. With this technology, a received FM signal is processed using a 'matched filter,' which compresses the continuous received energy into a series of narrow pulses. These narrow pulses provide excellent resolution in the time domain, required for accurate determination of position and time.

This system makes use of 100% of the transmitted power, 100% of the time instead of 25% of the power, 1% of the time. This provides superior signal to noise ratio and similar rejection of skywave interference, at lower system cost. Compressing the signal in the receiver using digital signal processing is far more practical than generating an equivalent pulse directly in the transmitter.

Due to the 'pulse compression ratio' of such a system, a 10 kW CW transmitter develops an effective pulsed transmit power of 1-2 megawatts, without dealing with the resulting difficulties of high pulsed power at the transmit site: the CW-FM transmitter signal is 'compressed' into a series of short pulses in the receiver by signal processing. The transmitter itself sees only the modest power CW-FM signal.

Using slightly different waveshapes in a single transmitter to encode message data (300-1k bps), the subject invention further provides a medium-bandwidth data channel with sufficient capacity to provide premium services such as authentication and differential corrections.

Spoofing resistance results from the fact that low frequency (~100 kHz) signals are inherently difficult to get into the air, and high transmit power is required to overcome the extremely high level of atmospheric noise in the LF band, as much as 140 dB (power ratio: 100,000,000,000,000 times) above thermal noise; see e.g. ITU-R Recommendation P. 372-13-2016. Efficient antennas at 100 kHz are quite large, requiring 15-60 Ha (40-160 acres) of space to put in place. They typically need towers on the order of 220 m or 720 feet tall, which cost around $300,000-400,000 each (depending on terrain) and cannot be built quickly, nor without being detected by means of remote sensing, such as satellite imaging.

Smaller antennas (e.g., the size of a GNSS receive patch, 25 mm square) work well to receive low-frequency signals, but to efficiently transmit a signal requires an antenna that is a modest proportion of a wavelength in dimension. The wavelength of the 100 kHz signal is 3 km; a quarter-wave vertical tower (the 'ideal' transmitting antenna) is therefore about 750 m or 2500 ft. tall. This is not practical. A typical Loran-C antenna design uses a 625' (190 m) mast. This is $\frac{1}{16}$ of a wavelength; shorter antennas do not radiate efficiently. (The same paradigm also applies to AM broadcasting . . . tall transmit towers are used, but a receiver can have a tiny ferrite antenna or even less, and work fine. AM wavelengths are around $\frac{1}{10}$ of 100 kHz—200 to 600 meters.)

A spoofer or jammer would need to efficiently transmit a powerful signal in one or better, several locations if he hoped to attack such a system. This is easy to do with GNSS—the wavelength is about 19 cm so a transmitter the size of a ballpoint pen can have an efficient radiator (and many GNSS jammers look very much like a pen). This is much harder to do at a wavelength of 3 km, particularly so in any manner pretending to be covert or rapid-response.

FIG. 1 shows an example of a low-frequency radio navigation system 100 in accordance with aspects of the present disclosure. Specifically, FIG. 1 shows a low-frequency radio navigation system 100 based on chirped spread-spectrum modulation. This system includes a plurality of transmitters 110, arranged in a geographically-optimized pattern intended to provide signals to receivers 115 located in a certain area of service, such that any such receiver 115 is able to receive at least three simultaneous signals from different transmitters 110, and preferably more. It also includes one or more receivers 115, which obtain precise position, navigation or time information by decoding the signals received from the transmitters 110. The system may also include one or more control center(s) 105.

The transmitters 110 radiate a continuous, constant-power chirped-FM signal, comprising a base modulation, which provides the benefit of spreading the signal and then allowing it to be compressed to a narrow equivalent-time pulse, achieving high resolution in the time domain and allowing signals from the plurality of transmitters 110 to be 'separated' from each other in the receiver 115; and a data modulation, which can be used to send information from the transmitters 110 to the receivers 115. This information includes basic navigation and timing information, and ancillary services such as altimeter corrections, authentication codes, and corrections for radio propagation parameters.

The base modulation and the data modulation are 'orthogonal,' which means that they can be combined in the transmitter 110 without significant effect on each other, and then separated in the receiver 115 using appropriate signal processing. The base modulation is a periodic signal, for example, a sine wave, triangle wave, ramp or some combination of them. The data modulation is, for example, a shaped frequency-shift keying signal with one or more possible waveshapes per cycle of the base modulation, each state corresponding to a particular transmitted data symbol.

For example, a particularly advantageous choice is 8 states (waveshapes) for every half period of a sinusoidal base modulation. This allows one 3-bit symbol to be transmitted every half period, or two symbols (total 6 bits) each period of the base modulation. The 'shaping' can be any of a wide range of functions, for example the well-known 'window functions' as are commonly used in spectral analysis: Hann, Blackman, etc. Shaping allows the spectrum of the resulting signal to be controlled, meeting the requirement of efficient spectral utilization.

The receivers 115 contain a bank of 'matched filters,' whose function is to compress the received signal comprising the sum of the signals transmitted by the plurality of transmitters 110 in the system into a series of pulses, each of which contains embedded (a) time or phase information, relative to a local clock signal in the receiver 115; (b) identification of the transmitter 110 from which the signal was sent; and (c) data symbol(s) encoded in that pulse. The matched filters provide the function of 'correlation,' i.e., they embody an impulse response which is the inverse of the transmitted signal. For a plurality of transmitters 110, each transmitting one of several data symbols, a bank of filters is required having the number of individual filters equal to the product of the number of transmitters 110 and the number of possible data states (symbols), e.g. 8 for a 3-bit symbol set. For 10 transmitter tracking channels and a 3-bit symbol set, 80 filters (correlators) are needed.

The information coming from the matched filter bank also allows the detection of potentially corrupted data symbols. Such corruption could come from interfering signals, or from interactions between the signals from the separate transmitters 110.

The transmitters 110 (and receivers 115) in this system operate on single shared frequency allocation, which is why it is important to use a form of modulation which offers low auto-correlation and cross-correlation properties, thus maximizing the ability of the receiver 115 to discriminate between the signals originating from the nearby transmitters 110. One beneficial way to do this is to use a common modulation wave shape (a sinusoid, for instance) with different modulation rates. This allows the signals to be separated in the receiver 115, due to the differences in the impulse responses of the filters in the matched filter bank.

Because of noise, interfering signals, and imperfect separation of the signals in the matched filter bank, errors in decoding the data symbols will occasionally occur. Thus, such a system may beneficially use some form of forward error correction, such as Reed-Solomon coding, which can both detect and correct errors in the decoded symbols. It is advantageous if the receiver 115 can identify some or most of the symbols that are possibly corrupted, because forward error-correction codes are more efficient when only correcting, rather than detecting and correcting, errors. Matched filter banks can sometimes identify such potentially corrupted signals, for instance, by observing that no one output pulse clearly dominates (matches the possibilities) in the comparison scheme.

This system provides nearly-optimum utilization of the frequency allocation, because when the FM deviation and the base modulation parameters are carefully chosen, the resulting signal energy spectrum (in the frequency domain) has a fairly uniform distribution across most of the allocation, dropping sharply at the band edges. This contrasts to pulse amplitude modulation, in which the energy distribution drops off only slowly outside of the 'useful' band. Shaped pulses improve the situation somewhat, but cannot approach the spectral efficiency of optimized FM. For particularly advantageous embodiments of this invention, for instance an FM deviation of +/−8.8 kHz at a base sinusoidal modulation rate of 100-166 Hz, with two 3-bit symbols per cycle having an integrated phase deviation of +/−(2, 6, 10, or 14)π radians shaped with a Blackman window, 99.99% of the signal energy may be contained within the +/−10 kHz allocated band, while using 90% of the allocated band.

While the transmitters 110 nominally operate continuously and at constant RF power, it may be advantageous to turn each transmitter 110 off periodically, providing the following benefits: (a) to allow symbol synchronization; (b) to allow a transmitter 110 site to 'listen' to its nearby peers without being overloaded by its own signal; and (c) to allow a receiver 115 to listen to distant transmitters 110 without being overloaded by a strong, nearby transmitter 110. A receiver 115's ability to listen to distant transmitters 110 in the presence of a strong nearby signal (i.e. its dynamic range) may be further extended by using either or both (a) active cancellation of the nearby signal, i.e. subtracting a facsimile of that signal before further processing; and/or (b) using an antenna which has the ability to electronically 'steer' a 'null' in the direction of the nearby transmitter 110.

Such an antenna may be constructed, for instance, as taught in U.S. Pat. No. 3,031,663, in which two similar magnetic windings are arranged on a square slab of ferrite material at right angles to each other. The output of the windings may be summed with different weighting factors, where the weighting factors correspond to the sine and cosine of a desired steering angle. This will produce a figure-8 pattern, which has broad maxima in two opposing directions, and narrow minima (nulls) at 90 degree angles to the maxima. U.S. Pat. No. 4,087,187 further teaches the enhancement of adding a signal derived from an element sensitive to electric fields (the ferrite windings are sensitive to magnetic fields), which converts the figure-8 pattern to a cardioid pattern, having a single null opposite an even broader maximum.

Such antennas may also be used to implement a form of automatic direction finding, where the signals from the two (or three) elements are compared to each other, and the direction of arrival can be determined mathematically. This information can be used to find an initial, approximate position fix which can accelerate acquisition and resolve uncertainties in certain position solutions.

An efficient and elegant means to build the transmitter 110 of such a radionavigation system is to synthesize the output signal directly in the power stage, without the need for intervening amplification steps. With today's power electronics, generating a signal of tens of kilowatts at ~100 kHz is a straightforward exercise for one skilled in the relevant arts. One particularly favorable implementation uses a stepped voltage waveform, which can be generated simply with MOSFET power switches and simple series combiners, such as transformers with their secondary windings connected in series. The relative magnitudes of the steps is fixed, corresponding to a simple series of phase angles across one cycle of the output signal, and the transmitter 110 steps continuously from one step to the next, thus synthesizing a stepped approximation to a sine wave. The timing of each step may be precisely controlled, allowing both the frequency and phase angle of the generated signal to be determined with very fine resolution by an appropriate controller.

Such a waveform (stepped approximation to a sine wave) contains harmonics of the fundamental frequency. To avoid unnecessary interference with other spectrum users, a band-pass filter should be incorporated between the stepped power stage and the antenna, to reject the harmonics. Fortuitously, the band-pass filter can also be optimized to cancel part of the antenna system's reactive impedance at frequencies away from resonance, thus improving the antenna system's usable bandwidth.

Even so, the antenna (being smaller than the 'ideal' quarter wave monopole) inevitably has a bandwidth narrower than the frequency allocation, which makes operating at constant transmitter 110 power (across the allocation) more difficult. But, since at any instant in time, the transmitter 110 operates at a single frequency, the dc voltage feeding the switched power stage can be adjusted, so that the antenna current (which produces the radiated power by acting in concert with the antenna's radiation resistance, $P=I^2R$) may be controlled appropriately. Likewise, the phase angle of the stepped synthesizer may be adjusted to compensate for the remaining reactive impedance of the antenna system/band-pass filter combination.

This creates a form of 'active antenna tuner' which results in constant radiated power across a bandwidth several times greater than the nominal VSWR bandwidth of the antenna system itself. By continually adjusting the power-stage supply voltage along with the phase compensation, the antenna current can be maintained at the correct magnitude and phase angle at all times. This is further facilitated using an antenna-current sensing system, which is connected in such a way as to provide a feedback signal, which allows the actual antenna current to be sensed and compared to the desired antenna current, thus permitting continuous, real-time adjustment of the power-supply voltage and phase-angle compensation factors by the controller.

Thus, low-frequency radio navigation system 100 may comprise a first transmitter 110 at a first location, the first transmitter 110 including: a first base coded modulator configured to generate a first base modulation; and a first data coded modulator configured to generate a first data modulation; where the first transmitter 110 radiates a first continuous, constant-power chirped-FM spread spectrum signal, including: the first base modulation; and the first data modulation, where the first data modulation is orthogonal to the first base modulation.

Low-frequency radio navigation system 100 may also comprise a second transmitter 110 at a second location, the second transmitter 110 including: a second base coded modulator configured to generate a second base modulation; and a second data coded modulator configured to generate a second data modulation; where the second transmitter 110 radiates a second continuous, constant-power chirped-FM spread spectrum signal, including: the second base modulation; and the second data modulation, where the second data modulation is orthogonal to the second base modulation.

Low-frequency radio navigation system 100 may also comprise a third transmitter 110 at a third location, the third transmitter 110 including: a third base coded modulator configured to generate a third base modulation; and a third data coded modulator configured to generate a third data modulation; where the third transmitter 110 radiates a third continuous, constant-power chirped-FM spread spectrum signal, including: the third base modulation; and the third data modulation, where the third data modulation is orthogonal to the third base modulation.

In some examples, the transmitter 110 radiates a continuous, constant-power chirped-FM spread spectrum signal, including: the base modulation; and the data modulation, where the data modulation is orthogonal to the base modulation. In some examples, the transmitter 110 shares a frequency band and carrier frequency with a set of other transmitters 110 in an array of transmitters 110. In some examples, signals from the transmitter 110 and the set of other transmitters 110 are identified and separated in the receiver 115. In some examples, transmit energy is spread over a fraction of a frequency band while minimizing power outside of the frequency band, where the fraction of the frequency band is 50% or greater and the power outside of the frequency band is less than 1%.

In some examples, the fraction is greater than 80%, and the power outside of the frequency band less than 0.1%. In some examples, active transmit power is constant. In some examples, the transmitter 110 is turned off periodically to synchronize a receiver 115 to the transmitter 110. In some examples, the transmitter 110 is turned off periodically where a transmitting site of the transmitter 110 receives signals from other transmitters 110 during a period when the transmitter 110 is turned off, whereby the transmitting site receives the signals without interference from the transmitter 110. In some examples, the transmitter 110 is turned off periodically where a receiver 115 receives signals from other transmitters 110 during a period when the transmitter 110 is turned off, whereby the receiver receives the signals without interference from the transmitter 110.

In some examples, the transmitter 110 includes a power output stage using direct digital synthesis. In some examples, the direct digital synthesis includes a stepped voltage waveform. In some examples, the stepped voltage waveform includes 4 to 64 steps per carrier cycle. In some examples, the stepped voltage waveform includes 10 to 20 steps per carrier cycle. In some examples, the transmitter 110 includes a band-pass filter stage between the power output stage and an antenna. In some examples, the band-pass filter stage is optimized to cancel out part of a reactive component of antenna impedance across at least parts of a frequency band, where a ratio of reactive-to-active power is less than 3 at band edges of the frequency band after the band-pass filter stage.

In some examples, a power supply voltage of the power output stage is continually adjusted to compensate for varying antenna impedance with frequency. In some examples, signal parameters are continually adjusted to compensate for phase variations of the power output stage, the band-pass filter stage, and an antenna system. In some examples, an amount of an adjustment of the signal parameters is determined by measuring an antenna current phase and magnitude and determining the amount of the adjustment. In some examples, a determination of adjustments is performed by one or any combination of a field programmable gate array, a digital signal processor, a microprocessor, or other computing device.

Transmitter 110 may receive values for modulating signal parameters; receive values for modulation signal corrections; receive a precise time reference signal; determine resulting modulation parameters, including frequency and phase angle; determine times when the direct digital stepped synthesizer should step to next levels; and output one or a set of digital signals for controlling an output of the direct digital stepped synthesizer, as a function of time. In some examples, values for the signal parameters are determined as continuous time functions. In some examples, values for the signal parameters are determined as sampled points.

Transmitter 110 may also receive values for signal parameters; receive values for signal corrections from a previous calculation, if available; sample antenna current from a transducer, as an analog signal; digitize the analog signal with an analog-to-digital converter, synchronized to a precise time reference signal; determine values of signal parameters of an antenna current; compare signal parameters of the antenna current to the signal parameters; determine values of the signal corrections; output values of the signal corrections; and store values of the signal corrections in a memory device.

Transmitter 110 may be an example of, or include aspects of, the corresponding element or elements described with reference to FIG. 2.

Receiver 115 may include a matched filter configured to process the continuous, constant-power chirped-FM spread spectrum signal. In some examples, the matched filter yields correlation of the base modulation and the data modulation to defined reference modulations.

In some examples, the receiver 115 further includes: means for determining a relative time of arrival of the continuous, constant-power chirped-FM spread spectrum signal from the transmitter 110 within one microsecond; means for determining which data symbol values are likely encoded in the continuous, constant-power chirped-FM spread spectrum signal; and means for determining whether data symbols encoded in the continuous, constant-power chirped-FM spread spectrum signal are corrupted. In some examples, the receiver 115 includes at least one additional matched filer for each base modulation frequency.

In some examples, forward error correction is used by the receiver 115 to compensate for symbol errors resulting from received noise, jamming or interfering signals, or signals from other transmitters 110 in the system. In some examples, a set of parity symbols are appended to each block of data symbols. In some examples, where likely corrupted symbols (data or parity) are marked as erased. In some examples, where erased symbols are corrected, requiring a single parity symbol each to correct. In some examples, error symbols, not detected a priori as corrupted, are detected and corrected, requiring two parity symbols each to detect and correct. In some examples, where a forward error correction code may be a Reed-Solomon code.

In some examples, the receiver 115 includes a multi-element antenna configured to allow a received signal to be processed and combined to steer a null or maximum in a direction of an undesired or desired transmitter 110, and further configured to allow the received signal to be processed in such a way as to determine an approximate direction of a given transmitter 110.

Receiver 115 may be an example of, or include aspects of, the corresponding element or elements described with reference to FIG. 3.

Figure 2:
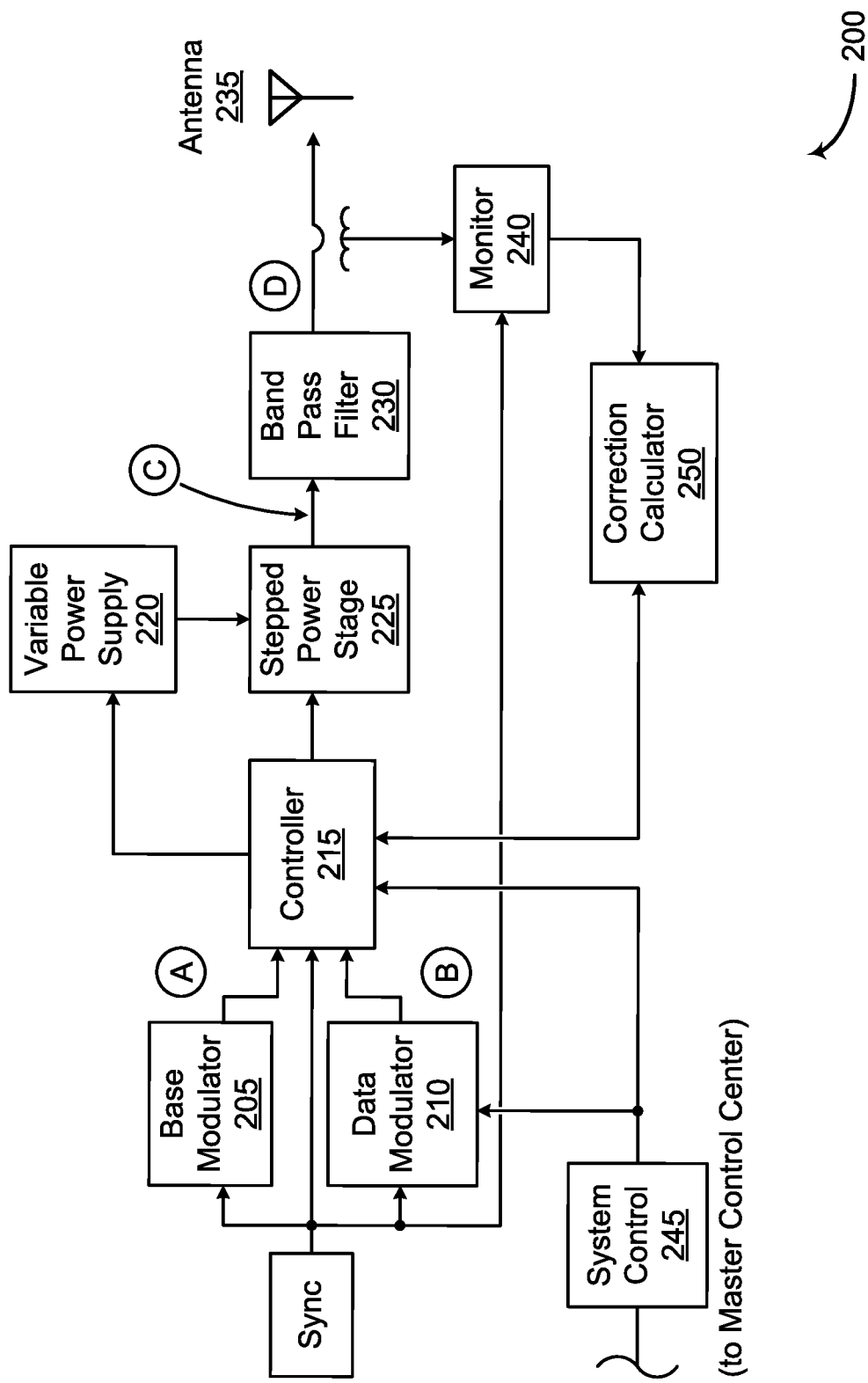
FIG. 2 shows an example of a transmitter in accordance with aspects of the present disclosure.

FIG. 2 shows an example of a transmitter 200 in accordance with aspects of the present disclosure. Transmitter 200 may be an example of, or include aspects of, the corresponding element or elements described with reference to FIG. 1. Transmitter 200 may include base coded modulator 205, data coded modulator 210, controller 215, variable power supply 220, stepped power stage 225, band pass filter 230, antenna 235, monitor 240, system control 245, and correction calculator 250.

Base coded modulator 205 may be configured to generate a base modulation. In some examples, the base modulation includes a periodic frequency modulation (FM) waveform. In some examples, the base modulation is the periodic frequency modulation (FM) waveform selected from the group of waveforms consisting of a triangle waveform, a ramp (sawtooth) waveform, a sinusoid waveform, and combinations of one or more of such waveforms. In some examples, a base modulation frequency for each transmitter 200 in the array of transmitters is selected from a set of values.

Data coded modulator 210 may be configured to generate a data modulation. In some examples, the data modulation includes a continuous frequency-shift keying signal. In some examples, the continuous frequency-shift keying signal encodes at least one data symbol per period of the periodic frequency modulation (FM) waveform.

In some examples, the continuous frequency-shift keying signal is shaped with a window function. In some examples, the window function is selected from the group of functions consisting of Hann, Hamming, Blackman and Nutall. In some examples, the data modulation includes operational data including timing offsets, nominal transmitter antenna center position, and other information required for determination of position, navigation and time.

In some examples, the data modulation includes authentication data for allowing a receiver to validate that a message was sent by an authorized transmitter and was not corrupted or modified. In some examples, the data modulation includes differential corrections that encode time-varying signal propagation differences and other system errors from nominal, allowing a receiver to correct these errors resulting in greater accuracy. In some examples, the data modulation includes altimeter corrections used by a receiver along with a local barometric pressure measurement to provide 3-dimensional position information.

Figure 3:
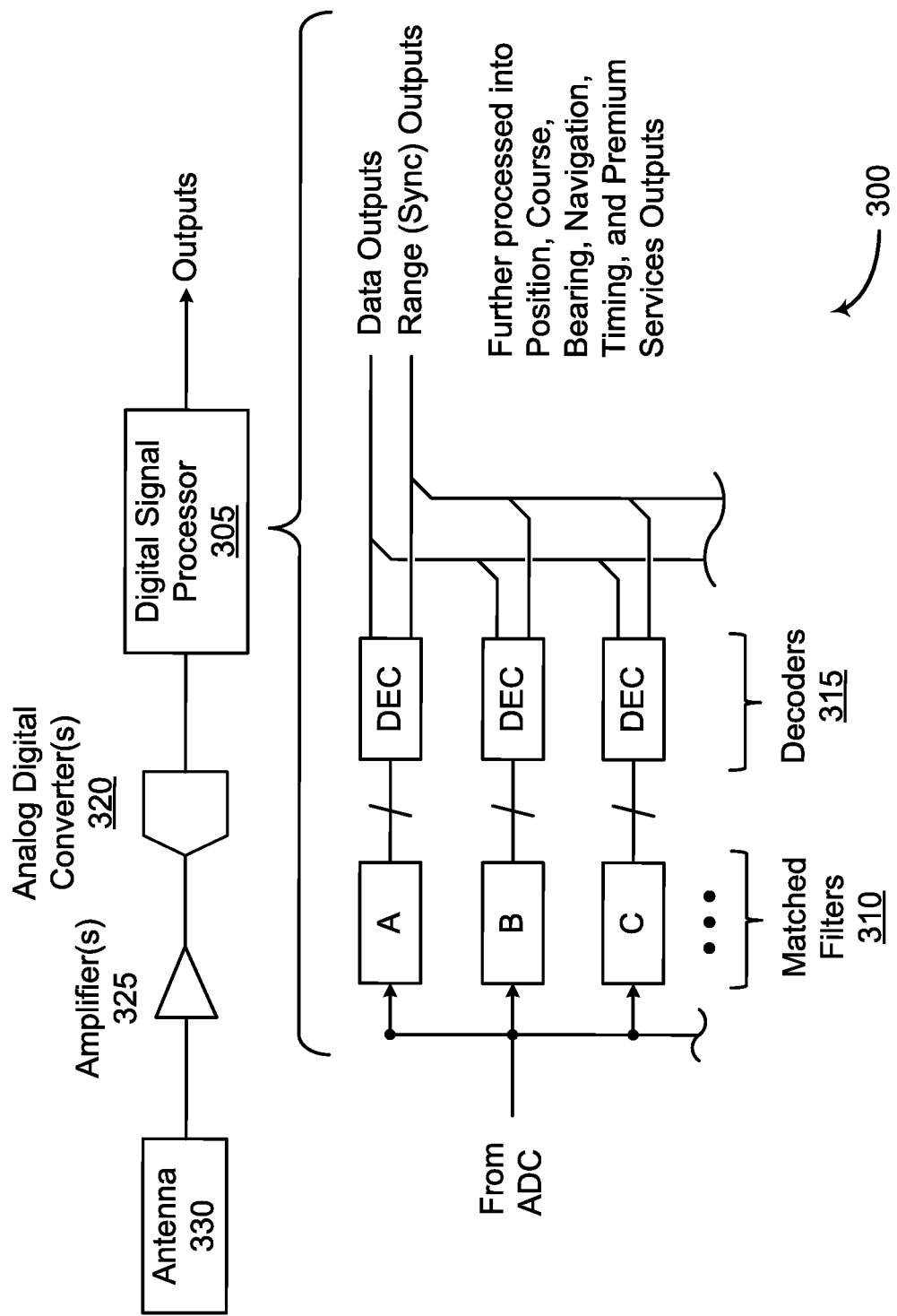
FIG. 3 shows an example of a receiver in accordance with aspects of the present disclosure.

FIG. 3 shows an example of a receiver 300 in accordance with aspects of the present disclosure. Receiver 300 may be an example of, or include aspects of, the corresponding element or elements described with reference to FIG. 1. Receiver 300 may include digital signal processor 305 and analog digital converter 320. Receiver 300 may also include amplifier(s) 325 and antenna(s) 330.

In some examples, the digital signal processor 305 receives and decodes received signals, which, after decoding, are re-created by digital synthesis and subtracted from other received signals, and processed to determine other transmitted signals, where co-channel interference is reduced. In some examples, the digital signal processor 305 is configured to use forward error correction to compensate for symbol errors.

In some examples, the digital signal processor 305 receives and decodes received signals, to provide position, navigation, or timing information. In some examples, the digital signal processor 305 receives and decodes received signals, to provide information selected from the group consisting of: position, course, course error, heading, velocity, acceleration, speed, time, distance to a next waypoint, a projected change in course or heading, time and frequency, message authentication.

Digital signal processor 305 may include matched filter 310 and decoder 315. In some examples, at least one matched filter 310 coupled to the digital signal processor 305, the at least one matched filter 310 configured to decode the base modulation and data-encoded modulation and provide a correlation function for received signals received from at least three geographically-spaced transmitters.

Figure 4:
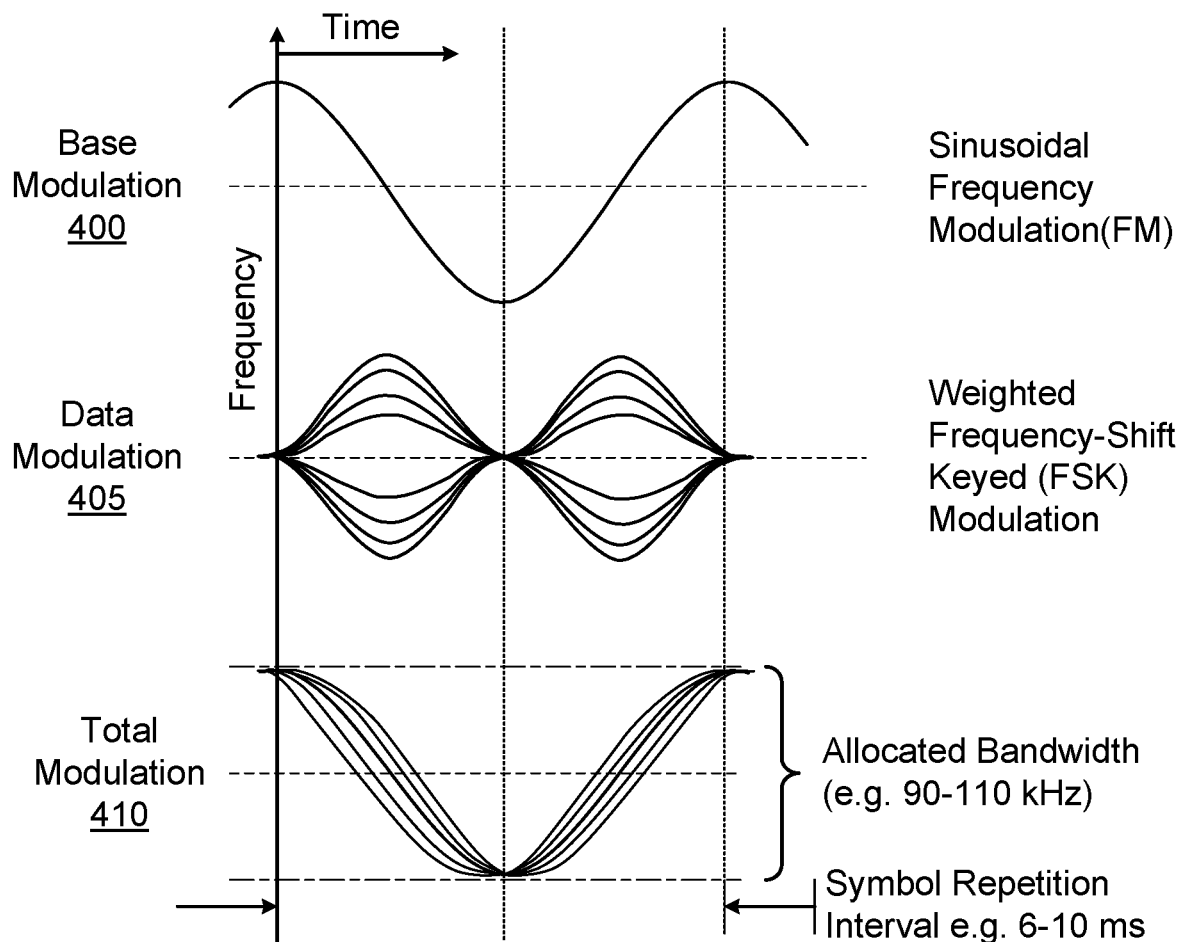
FIG. 4 shows an example of modulation signals of a transmitter in accordance with aspects of the present disclosure.

FIG. 4 shows an example of modulation signals of a transmitter in accordance with aspects of the present disclosure. The example shown includes base modulation 400, data modulation 405, and total modulation 410.

Figure 5:
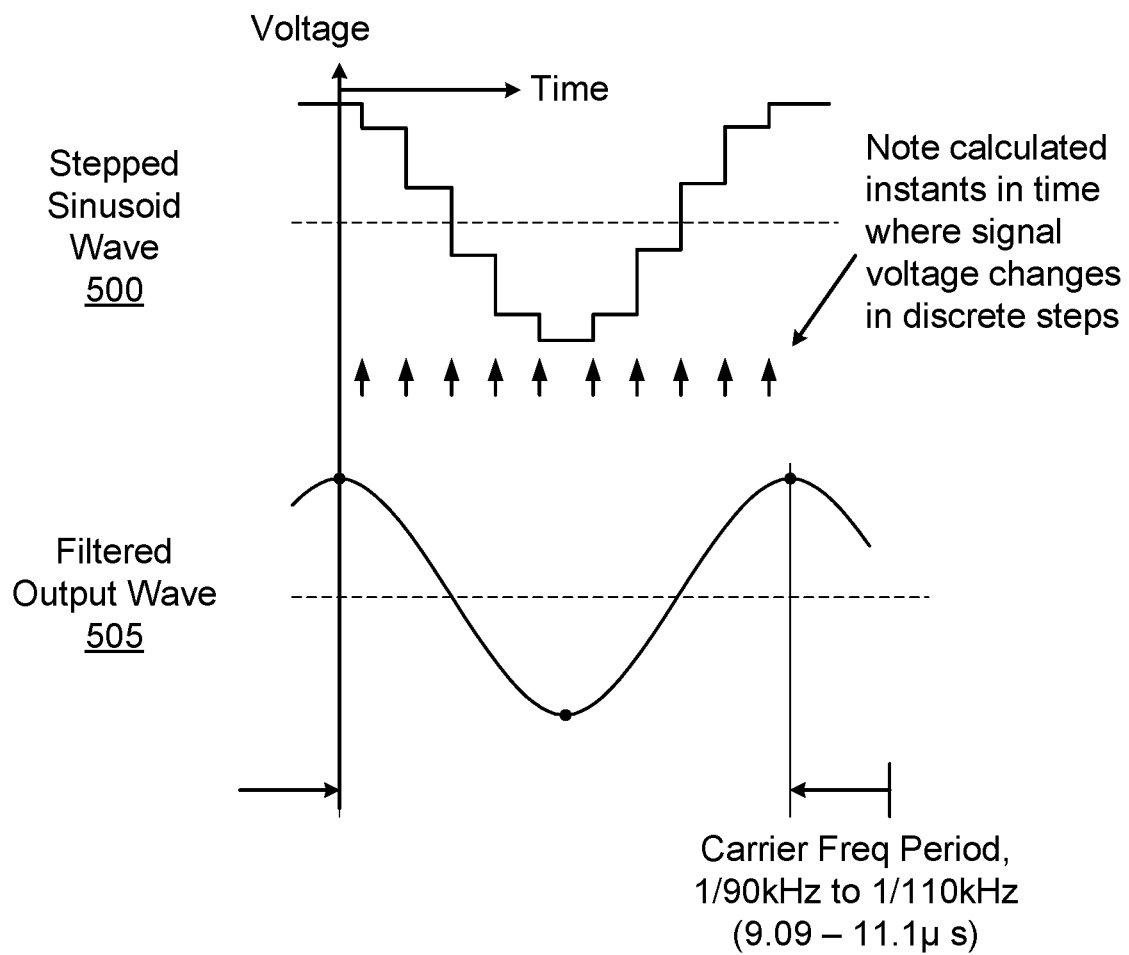
FIG. 5 shows an example of carrier signals of a transmitter in accordance with aspects of the present disclosure.

FIG. 5 shows an example of carrier signals of a transmitter in accordance with aspects of the present disclosure. The example shown includes stepped sinusoid wave 500 and filtered output wave 505.

Figure 6:
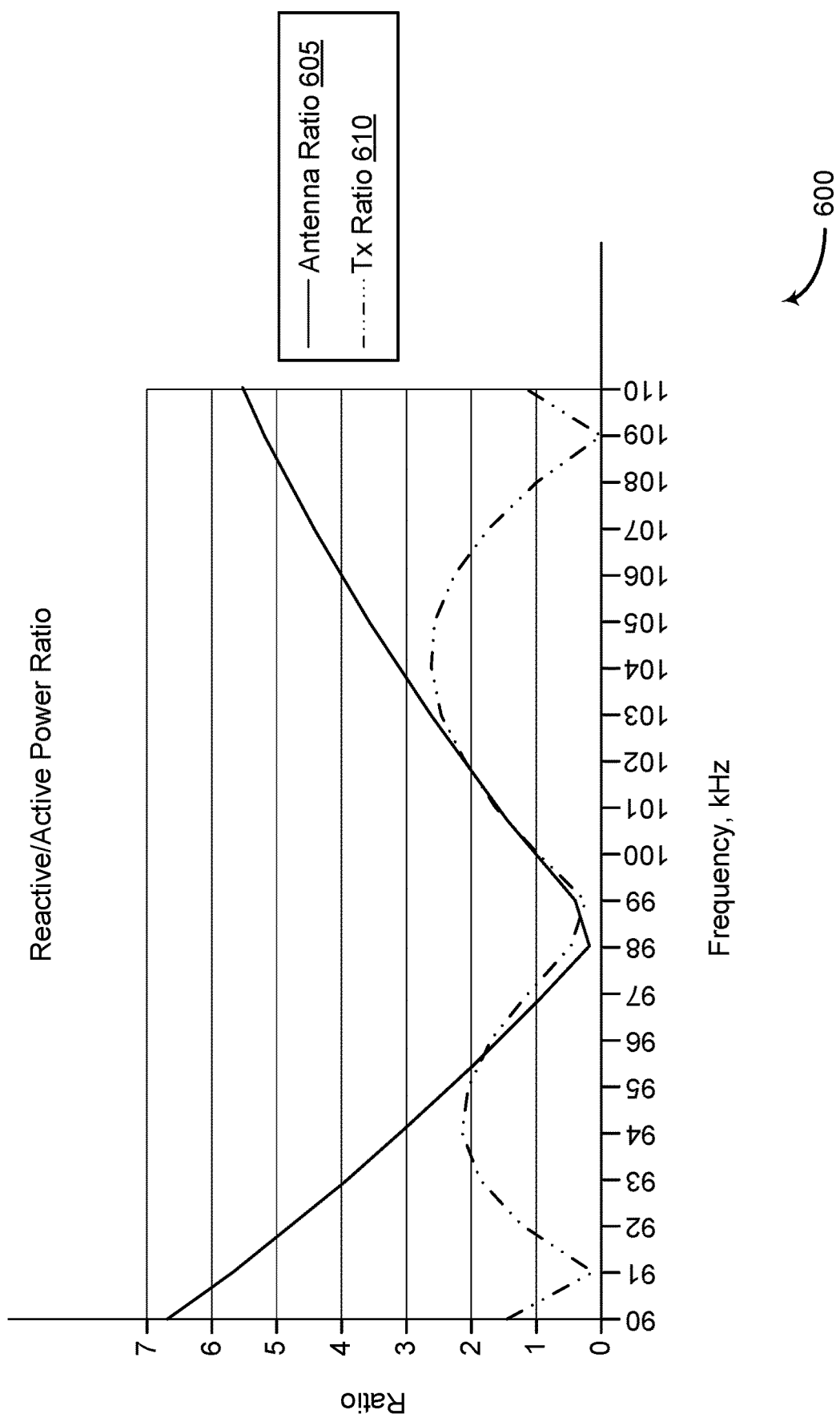
FIG. 6 shows an example of active/reactive power ratios for an antenna and a transmitter in accordance with aspects of the present disclosure.

FIG. 6 shows an example of active/reactive power ratios for an antenna and a transmitter in accordance with aspects of the present disclosure. Graph 600 may include antenna ratio 605 (solid line) and transmitter ratio 610 (dashed line).

Figure 7:
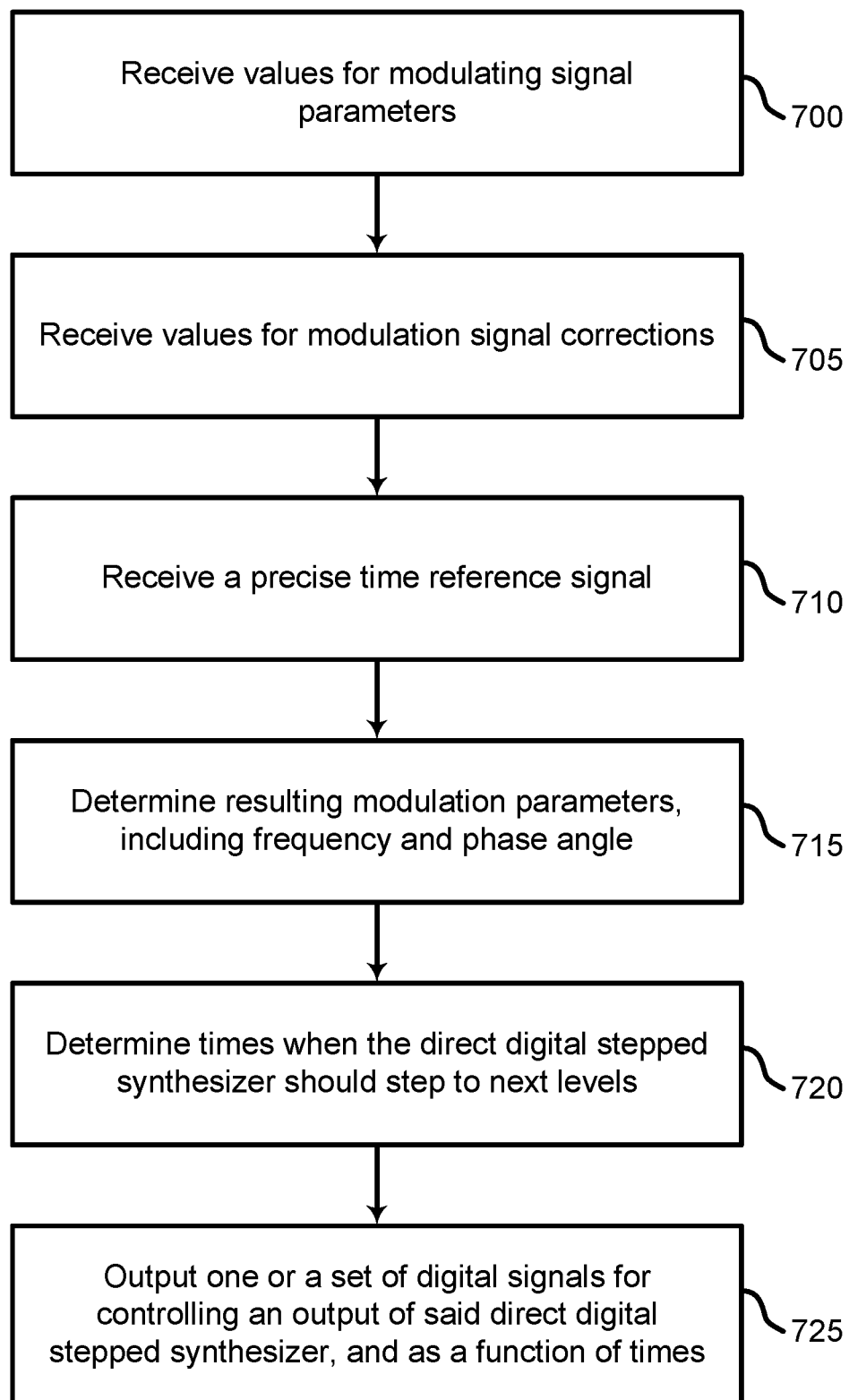
FIGS. 7 and 8 show examples of a process for low-frequency radio navigation utilizing continuous signal transmission in accordance with aspects of the present disclosure.

FIG. 7 shows an example of a process for low-frequency radio navigation utilizing continuous signal transmission in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 700, the system may receive values for modulating signal parameters. In some cases, the operations of this step may be performed by a transmitter as described with reference to FIGS. 1 and 2.

At step 705, the system may receive values for modulation signal corrections. In some cases, the operations of this step may be performed by a transmitter as described with reference to FIGS. 1 and 2.

At step 710, the system may receive a precise time reference signal. In some cases, the operations of this step may be performed by a transmitter as described with reference to FIGS. 1 and 2.

At step 715, the system may determine resulting modulation parameters, including frequency and phase angle. In some cases, the operations of this step may be performed by a transmitter as described with reference to FIGS. 1 and 2.

At step 720, the system may determine times when the direct digital stepped synthesizer should step to next levels. In some cases, the operations of this step may be performed by a transmitter as described with reference to FIGS. 1 and 2.

At step 725, the system may output one or a set of digital signals for controlling an output of the direct digital stepped synthesizer, as a function of time. In some cases, the operations of this step may be performed by a transmitter as described with reference to FIGS. 1 and 2.

Figure 8:
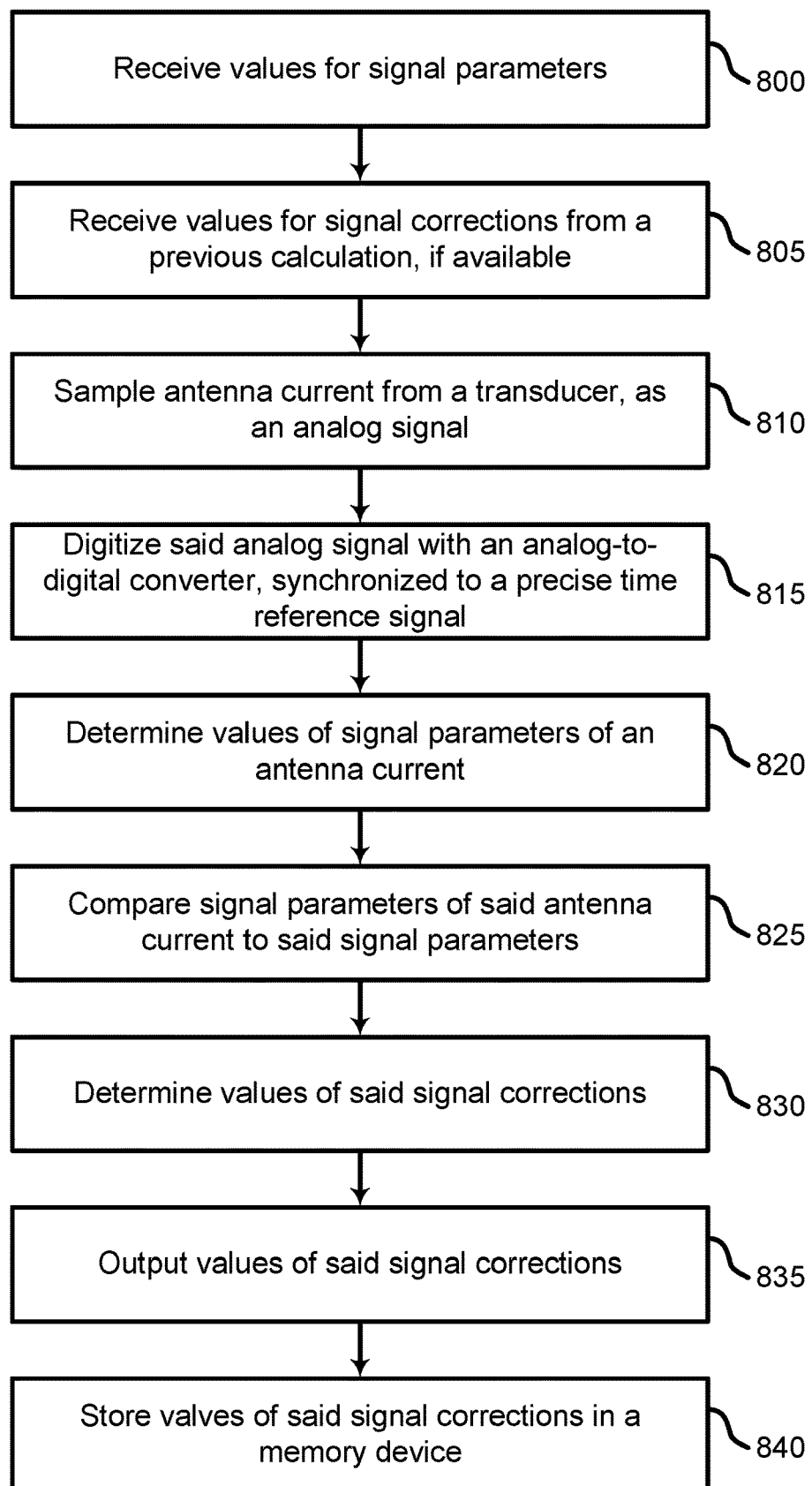

FIG. 8 shows an example of a process for low-frequency radio navigation utilizing continuous signal transmission in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 800, the system may receive values for signal parameters. In some cases, the operations of this step may be performed by a transmitter as described with reference to FIGS. 1 and 2.

At step 805, the system may receive values for signal corrections from a previous calculation, if available. In some cases, the operations of this step may be performed by a transmitter as described with reference to FIGS. 1 and 2.

At step 810, the system may sample antenna current from a transducer, as an analog signal. In some cases, the operations of this step may be performed by a transmitter as described with reference to FIGS. 1 and 2.

At step 815, the system may digitize the analog signal with an analog-to-digital converter, synchronized to a precise time reference signal. In some cases, the operations of this step may be performed by a transmitter as described with reference to FIGS. 1 and 2.

At step 820, the system may determine values of signal parameters of an antenna current. In some cases, the operations of this step may be performed by a transmitter as described with reference to FIGS. 1 and 2.

At step 825, the system may compare signal parameters of the antenna current to the signal parameters. In some cases, the operations of this step may be performed by a transmitter as described with reference to FIGS. 1 and 2.

At step 830, the system may determine values of the signal corrections. In some cases, the operations of this step may be performed by a transmitter as described with reference to FIGS. 1 and 2.

At step 835, the system may output values of the signal corrections. In some cases, the operations of this step may be performed by a transmitter as described with reference to FIGS. 1 and 2.

At step 840, the system may store values of the signal corrections in a memory device. In some cases, the operations of this step may be performed by a transmitter as described with reference to FIGS. 1 and 2.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A low-frequency radio navigation system comprising:
a transmitter comprising:
a base coded modulator configured to generate a base modulation;
a data coded modulator configured to generate a data modulation;
wherein the transmitter radiates a continuous, constant-power chirped-FM spread spectrum waveform, comprising:
the base modulation; and
the data modulation, wherein the data modulation is orthogonal to the base modulation; and
a power output stage.

2. The low-frequency radio navigation system of claim 1, wherein:
active transmit power is constant.

3. The low-frequency radio navigation system of claim 1, wherein:
the transmitter is turned off periodically to synchronize a receiver to the transmitter.

4. The low-frequency radio navigation system of claim 1, wherein:
the transmitter is turned off periodically wherein a transmitting site of the transmitter receives signals from other transmitters during a period when the transmitter is turned off, whereby the transmitting site receives the signals without interference from the transmitter.

5. The low-frequency radio navigation system of claim 1, wherein:
the transmitter is turned off periodically wherein a receiver receives signals from other transmitters during a period when the transmitter is turned off, whereby the receiver receives the signals without interference from the transmitter.

6. The low-frequency radio navigation system of claim 1, wherein:
the transmitter comprises said power output stage using direct digital synthesis.

7. The low-frequency radio navigation system of claim 6, wherein:
said direct digital synthesis comprises a stepped voltage waveform.

8. The low-frequency radio navigation system of claim 7, wherein:
said stepped voltage waveform comprises 4 to 64 steps per carrier cycle.

9. The low-frequency radio navigation system of claim 8, further comprising:
a processor controlling timing of steps of said stepped voltage waveform.

10. The low-frequency radio navigation system of claim 1, wherein:
said transmitter comprises a band-pass filter stage between said power output stage and an antenna.

11. The low-frequency radio navigation system of claim 10, wherein:
said band-pass filter stage is optimized to cancel out part of a reactive component of antenna impedance across at least parts of a frequency band, wherein a ratio of reactive-to-active power is less than 3 at band edges of the frequency band after said band-pass filter stage.

12. The low-frequency radio navigation system of claim 10, wherein:
a power supply voltage of said power output stage is continually adjusted to compensate for varying antenna impedance with frequency.

13. The low-frequency radio navigation system of claim 10, wherein:
modulation parameters are continually adjusted to compensate for phase variations of said power output stage, said band-pass filter stage, and an antenna system.

14. The low-frequency radio navigation system of claim 13, wherein:
an amount of an adjustment of the modulation parameters is determined by measuring an antenna current phase and magnitude and determining said amount of the adjustment.

15. The low-frequency radio navigation system of claim 13, wherein:
a determination of adjustments is performed by one or any combination of a field programmable gate array, a digital signal processor, a microprocessor, or other computing device.

16. The low-frequency radio navigation system of claim 1, further comprising:
a receiver receiving received signals, and a digital signal processor.

17. The low-frequency radio navigation system of claim 16, wherein the digital signal processor receives and decodes the received signals, which, after decoding, are re-created by digital synthesis and subtracted from other received signals, and processed to determine other transmitted signals, wherein co-channel interference is reduced.

18. The low-frequency radio navigation system of claim 16, wherein:
said digital signal processor is configured to use forward error correction to compensate for symbol errors.

19. The low-frequency radio navigation system of claim 16, further comprising:
a multi-element antenna configured to allow a received signal to be processed and combined to steer a null or maximum in a direction of an undesired or desired transmitter, and further configured to allow the received signal to be processed in such a way as to determine an approximate direction of a given transmitter.

20. A method for determining a voltage step timing in a direct digital stepped synthesizer in a transmitter, comprising:
receiving values for modulating signal parameters;
receiving values for modulation signal corrections;
receiving a precise time reference signal;
determining resulting modulation parameters, including frequency and phase angle;
determining times when the direct digital stepped synthesizer should step to next levels; and
outputting one or a plurality of digital signals for controlling an output of said direct digital stepped synthesizer, and as a function of times.

21. The method of claim 20, wherein:
values for said signal parameters are determined as continuous time functions.

22. The method of claim 20, wherein:
values for said signal parameters are determined as sampled points.

23. An apparatus for determining a voltage step timing in a direct digital stepped synthesizer in a transmitter, comprising:
    a processor and a memory storing instructions and in electronic communication with the processor, the processor being configured to execute the instructions to:
    receive values for modulating signal parameters;
    receive values for modulation signal corrections;
    receive a precise time reference signal;
    determine resulting modulation parameters, including frequency and phase angle;
    determine times when the direct digital stepped synthesizer should step to next levels; and
    output one or a plurality of digital signals for controlling an output of said direct digital stepped synthesizer, and as a function of times.

24. A non-transitory computer readable medium storing code for determining a voltage step timing in a direct digital stepped synthesizer in a transmitter, the code comprising instructions executable by a processor to:
    receive values for modulating signal parameters;
    receive values for modulation signal corrections;
    receive a precise time reference signal;
    determine resulting modulation parameters, including frequency and phase angle;
    determine times when the direct digital stepped synthesizer should step to next levels; and
    output one or a plurality of digital signals for controlling an output of said direct digital stepped synthesizer, and as a function of times.

25. The non-transitory computer readable medium of claim 24, wherein:
    values for said signal parameters are determined as continuous time functions.

26. The non-transitory computer readable medium of claim 24, wherein:
    values for said signal parameters are determined as sampled points.

27. A method for estimating signal corrections, comprising:
    receiving values for signal parameters;
    receiving values for signal corrections from a previous calculation, if available;
    sampling antenna current from a transducer, as an analog signal;
    digitizing said analog signal with an analog-to-digital converter, synchronized to a precise time reference signal;
    determining values of signal parameters of an antenna current;
    comparing signal parameters of said antenna current to said signal parameters;
    determining values of said signal corrections;
    outputting values of said signal corrections; and
    storing valves of said signal corrections in a memory device.

28. An apparatus for estimating signal corrections, comprising:
    a processor and a memory storing instructions and in electronic communication with the processor, the processor being configured to execute the instructions to:
    receive values for signal parameters;
    receive values for signal corrections from a previous calculation, if available;
    sample antenna current from a transducer, as an analog signal;
    digitize said analog signal with an analog-to-digital converter, synchronized to a precise time reference signal;
    determine values of signal parameters of an antenna current;
    compare signal parameters of said antenna current to said signal parameters;
    determine values of said signal corrections;
    output values of said signal corrections; and
    store valves of said signal corrections in a memory device.

29. A non-transitory computer readable medium storing code for estimating signal corrections, the code comprising instructions executable by a processor to:
    receive values for signal parameters;
    receive values for signal corrections from a previous calculation, if available;
    sample antenna current from a transducer, as an analog signal;
    digitize said analog signal with an analog-to-digital converter, synchronized to a precise time reference signal;
    determine values of signal parameters of an antenna current;
    compare signal parameters of said antenna current to said signal parameters;
    determine values of said signal corrections;
    output values of said signal corrections; and
    store valves of said signal corrections in a memory device.

\* \* \* \* \*

UNITED STATES PATENT AND TRADEMARK OFFICE
CERTIFICATE OF CORRECTION

PATENT NO. : 12,181,557 B2
APPLICATION NO. : 18/135721
DATED : December 31, 2024
INVENTOR(S) : Dickerson Page 1 of 1

It is certified that error appears in the above-identified patent and that said Letters Patent is hereby corrected as shown below:

In the Claims
Claim 27, Column 20, Line 7, delete "valves" and insert --values--.
Claim 28, Column 20, Line 28, delete "valves" and insert --values--.
Claim 29, Column 20, Line 46, delete "valves" and insert --values--.

Signed and Sealed this
Eleventh Day of February, 2025

Coke Morgan Stewart
*Acting Director of the United States Patent and Trademark Office*